United States Patent
Wong

(10) Patent No.: US 6,811,082 B2
(45) Date of Patent: *Nov. 2, 2004

(54) ADVANCED MAGNETIC STRIPE BRIDGE (AMSB)

(76) Inventor: Jacob Y. Wong, 7110 Georgetown Rd., Goleta, CA (US) 93117

(*) Notice: Subject to any disclaimer, the term of this patent is extended or adjusted under 35 U.S.C. 154(b) by 112 days.

This patent is subject to a terminal disclaimer.

(21) Appl. No.: 09/985,227

(22) Filed: Nov. 2, 2001

(65) Prior Publication Data

US 2003/0057278 A1 Mar. 27, 2003

Related U.S. Application Data

(63) Continuation-in-part of application No. 09/953,875, filed on Sep. 18, 2001, now Pat. No. 6,607,127.

(51) Int. Cl.[7] ................................................. G06K 7/10
(52) U.S. Cl. ........................................ 235/451; 235/492
(58) Field of Search ................................ 235/451, 449, 235/380, 382, 492, 487

(56) References Cited

U.S. PATENT DOCUMENTS

| | | | | |
|---|---|---|---|---|
| 4,791,283 A | * | 12/1988 | Burkhardt | 235/438 |
| 4,868,376 A | * | 9/1989 | Lessin et al. | 235/492 |
| 5,375,037 A | * | 12/1994 | Le Roux | 361/684 |
| 5,434,398 A | * | 7/1995 | Goldberg | 235/380 |
| 5,538,442 A | * | 7/1996 | Okada | 439/676 |
| 5,623,552 A | * | 4/1997 | Lane | 382/124 |
| 5,818,030 A | * | 10/1998 | Reyes | 235/492 |
| 5,936,226 A | * | 8/1999 | Aucsmith | 235/492 |
| 5,955,961 A | * | 9/1999 | Wallerstein | 340/5.4 |
| 6,188,309 B1 | * | 2/2001 | Levine | 340/5.66 |
| 6,206,293 B1 | * | 3/2001 | Gutman et al. | 235/493 |
| 6,213,403 B1 | * | 4/2001 | Bates, III | 235/492 |
| 6,394,343 B1 | * | 5/2002 | Berg et al. | 235/379 |
| 6,518,927 B2 | * | 2/2003 | Schremmer et al. | 343/702 |
| 2001/0011944 A1 | * | 8/2001 | Garrido-Gadea et al. | 340/5.86 |

FOREIGN PATENT DOCUMENTS

| | | | | |
|---|---|---|---|---|
| DE | 4202998 A1 | * | 8/1993 | G06K/7/08 |
| JP | 09305832 A | * | 11/1997 | G07D/9/00 |

* cited by examiner

*Primary Examiner*—Diane I. Lee

(57) ABSTRACT

A novel bridge device and accompanying methodology which link the world of the smart cards to that of the magnetic finance cards is described. This bridge device is called the Magnetic Stripe Bridge (MSB), whose primary function is to interface an ordinary or naked smart card, with just a smart chip embedded in, to a magnetic card reader for credit transaction without requiring alteration of the existing card processing infrastructure. This is done using techniques which include magnetic stripe signal emulation. Thus, any smart card is effectively transformed via the use of the MSB into an ordinary magnetic finance card and is admissible for use by any conventional magnetic card reader. Through this MSB and the accompanying methodology, secure smart cards can now be deployed everywhere, including on the Internet, thus significantly reducing the current extensive magnetic finance card fraud and identity theft. In baseline and alternate preferred embodiments, the MSB is adapted for use with lateral, swipe type magnetic card readers. Via an advanced preferred embodiment, an improved AMSB is adapted to enable usage with both swipe-type readers, as well as with ATM-like terminals which require virtually full longitudinal insertion of the card being used.

10 Claims, 9 Drawing Sheets

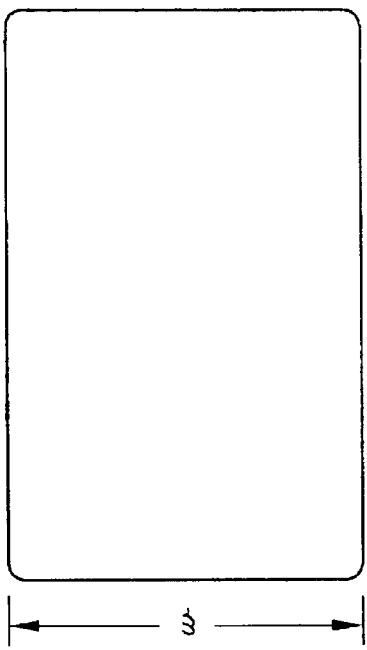
FIG. 1A
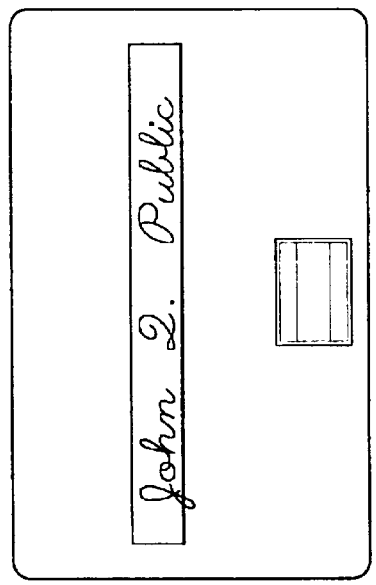
FIG. 1B
FIG. 1C
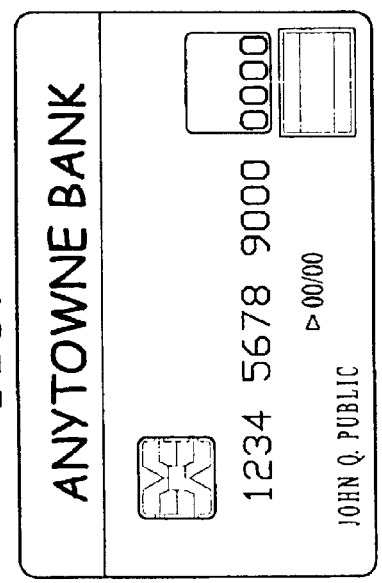
FIG. 2A
FIG. 2B

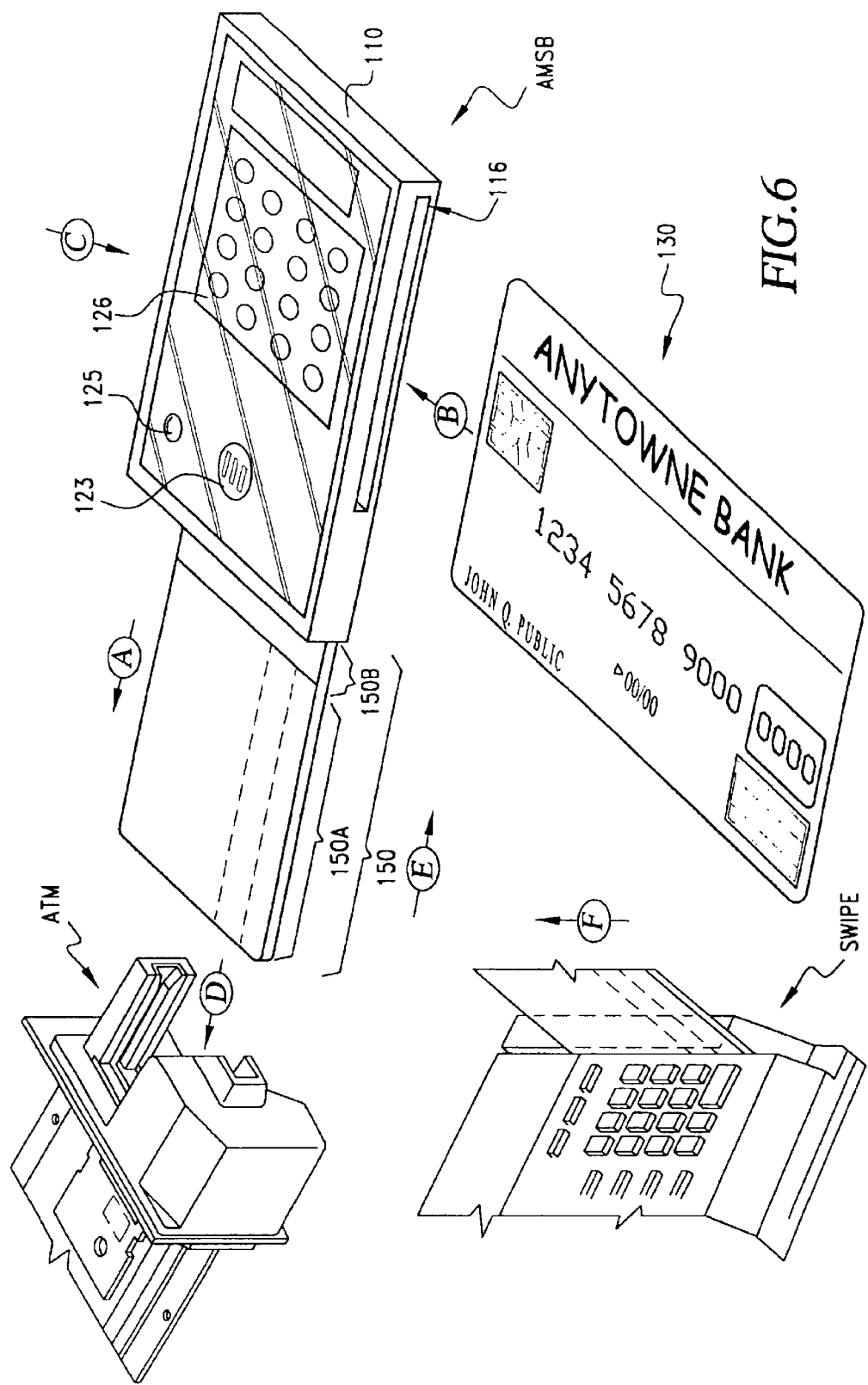

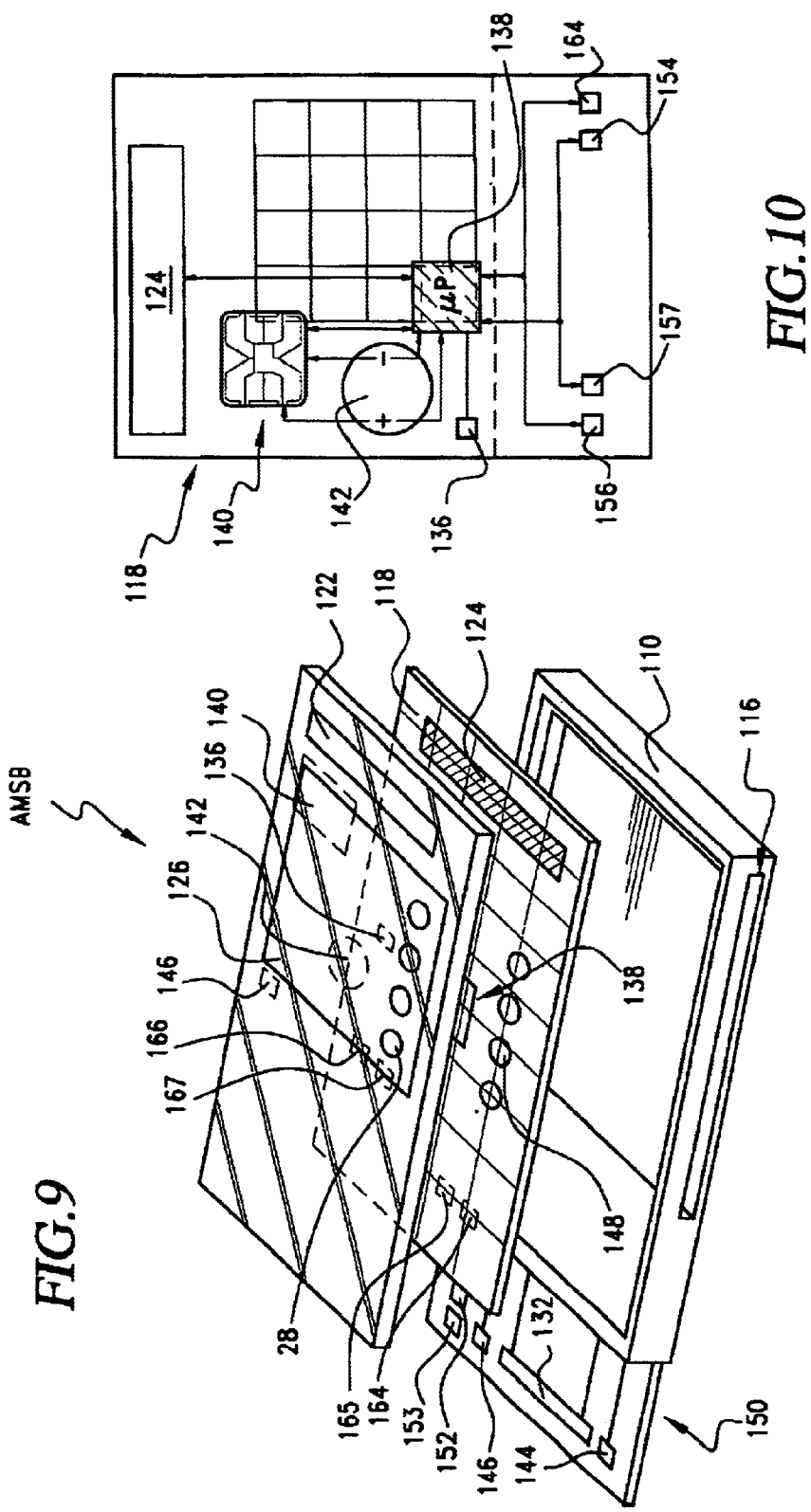

ADVANCED MAGNETIC STRIPE BRIDGE (AMSB)

This application is a continuation-in-part of application Ser. No. 09/953,875, filed Sep. 18, 2001 now U.S. Pat. No. 6,607,127.

TECHNICAL FIELD

The present invention is in the field of electronic devices and equipment used in the processing and/or facilitation of financial and security smart card transactions (such as credit cards, debit cards, access cards etc.) using the existing magnetic card storage medium processing infrastructure.

BACKGROUND

Credit cards have been in use in the US and around the world for decades. Unauthorized or fraudulent use of credit card purchases for goods and services has been with the credit card and financial card industry ever since its inception. At least in the US, the culprit has generally been attributed to the use of multiple-track magnetic stripe or magstripe (typically three tracks) for storing all the pertinent personal and credit card account information (in tracks 1 and 2) of the cardholder. The information contained in the magnetic stripe (typically Track 2 for credit cards) is not visible or readable directly from the card except with the use of a special decoding equipment such as a magnetic stripe reader or magnetic credit card reader commonly used in today's brick-and-mortar retail world for credit purchases of goods and services. It is a well-known fact that the cardholders' vital information stored in tracks 1 or 2 of the magnetic stripe on the back of credit cards can be easily "skimmed" or stolen. Consequently anyone can in principle create illegally any number of these credit cards for fraudulent use and identity theft purposes. This indeed is the crux of credit card fraud and cardholder identity theft problems in the US today.

The advent of the so-called smart cards (smart credit or finance cards) first came about in Europe about three decades ago offered a lot of hope, then and now, for solving the credit card fraud and identity theft problems. Plastic cards are used as the carrier of microchips which can store much more information and much more securely than the magstripes counterparts. Indeed, with the development of modern cryptography technology in recent years, which enabled smart cards to have a high degree of security, the popularity of smart cards and their acceptance as financial and banking instruments by the consumers, at least in Europe, started to grow and flourish during the past decade.

Despite a great deal of efforts in advertisement dollars and the investment of literally hundreds of millions of dollars in system infrastructure made by numerous banking associations during the past five years or more, most notably American Express in the rollout of their so-called "Blue Card" about two years ago, smart cards are simply not making any significant headway into the US marketplace. In other words, only a very small fraction of the US credit card holders today are using smart cards for credit purchases in the brick-and mortar retail world. For the very small percentage of smart card usage, most of them are used on the Internet.

Contrary to the situation in Europe today, where smart cards are the main stay for credit purchases for goods and banking services by the general populace, the behavior of most Americans towards smart card usage and acceptance in the US is generally considered as illogical, ridiculous (according to the Europeans) and difficult to explain. However, one can probably better understand the current smart card situation in the US by simply noting the fact that it took literally 20–25 years before the general public in the US accepts the use of the ATM (Automatic Teller Machine) cards for money withdrawal from the banks. The Bank of America first introduced such cards to the consumers in the early 1970's and it is not until recently (starting a few years ago) that the American public embraces this wonderful convenience.

Thus one can argue that it is the ultra-conservatism of the American public towards the acceptance of new ideas and concepts about money that best explains why smart cards fail to be widely accepted in the US today. In addition to this seemingly simple but truistic reason, there are other economical factors that might also contribute to their behavior. First of all, one must not forget about the fact that there are at present over 20 millions magnetic card readers in use in the US today. That represents almost $10 B worth of hardware that have to be thrown away if one were to replace them with new smart card readers. That is indeed a lot of money to be written off by the merchants from the economical standpoint and something not likely to happen unless there is an overwhelming reason for them to do so. As far as the merchants are concerned, it is not just the magnetic card readers that they have to replace which to them is hard-earned money. They also have to retrain their employees to use the new smart card readers which represents additional business expenses that they have to bear. That is the reason why the merchants themselves are not enthusiastic in switching from the magnetic cards to the smart cards. When it comes to the question of who are influencing who between the consumers and the merchants, it is the latter that have the upper hand. It is more likely for the consumers to change over to use the smart cards if they find out that their magnetic cards are no longer universally accepted by the merchants.

Finally since the American economy is the number one economy in the world, whatever the Americans accept or not accept in financial or business undertakings usually has a tremendous impact on the actions and reactions for the rest of the world. Thus the fact that Americans today do not embrace the use of smart cards in the US, it has an important but regressive or unfavorable impact on the rest of the global citizens and businesses. Case in point, when Americans travel overseas, either for business or for pleasure, they only carry magnetic credit cards. That pretty much forces the merchants of other parts of the world to also equip themselves with magnetic card readers in addition to smart card readers. Otherwise they might stand to lose the business of those American travelers that happen to visit their territories. As for the Europeans, when they travel to the US either on business or for pleasure, they have to take with them magnetic credit cards otherwise they would not be able to purchase on credit goods or services in the US. Thus there exists an urgent need for a novel device and methodology that can serve as a "bridge" in order to link the magnetic cards world to that of the smart cards. In other words, the American consumers must best be provided with smart cards that would be compatible and useable with the magnetic card processing infrastructure in the US. The same holds true for world citizens other than Americans. They must also be provided with smart cards that can be recognized for use by the magnetic card readers in the US. Of course by being able to successfully link the two credit card worlds, the magnetic card and the smart card can coexist until such time that the smart card would ultimately be the one to use by choice of technology, common sense and uniformity.

Over the past two decades, literally dozens of devices and methodologies have been advanced and patented. They all share the common goal of trying to drastically reduce or totally eliminate all credit card frauds and identity thefts in those parts of the world today, including the US, where magnetic credit and debit cards, and not smart cards, are still widely in use for financial and credit transactions. As alluded to briefly above, since the rampant credit card frauds and identity thefts are still very much with us in the US today, it is evident that none of the ideas advanced and patented to date, implemented or otherwise, have been working effectively at all to alleviate this situation. In particular, no one has ever advanced, until the present invention, the idea of taking advantage of the secured aspects of the smart card and somehow teaming or working in tandem with it to arrive at a viable approach to solving the credit card frauds and identity thefts problem.

Instead, almost all of these novel devices and methodologies advanced and patented to date focus only in how to modify the current magnetic credit and debit cards. New operating features have been added to them with new processing algorithms implemented including the installation of new and more advanced electronic subsystems in order to render these magnetic credit and debit cards and/or systems fraud resistant under all manners of conditions wherein they are used. One can categorize all the prior art in this field generally into three groups. Group one has to do with the novel improvement, new features and configurations for standalone cards. Group two has to do with the advancement of new methodologies in the processing and transaction systems for financial cards. Group three has to do with the advancement of card systems hardware encompassing new technologies in electronic components, devices and subsystems.

Examples of Group I prior art inventions relating to the novel improvement, new features and configuration for standalone cards are disclosed in the following patents:

| U.S. Pat. No. | Inventor | Date |
| --- | --- | --- |
| 4,614,861 | Parlov et al. | Sep. 30, 1986 |
| 4,701,601 | Francini et al. | Oct. 20, 1987 |
| 4,786,791 | Hodama | Nov. 22, 1988 |
| 4,791,283 | Burkhardt | Dec. 13, 1988 |
| 4,868,376 | Lessin et al. | Sep. 19, 1989 |
| 5,130,519 | Bush et. al | Jul. 14, 1992 |
| 42 02 998 (German) | Kreft | Aug. 5, 1993 |
| 5,317,636 | Vizcaino | May 31, 1994 |
| 5,434,398 | Goldberg | Jul. 18, 1995 |
| 5,789,732 | MaMahon et al. | Aug. 4, 1998 |
| 5,955,961 | Wallerstain | Sep. 21, 1999 |
| 6,089,451 | Krause | Jul. 18, 2000 |
| 6,095,416 | Grant et. al | Aug. 1, 2000 |
| 6,188,309 B1 | Levine | Feb. 13, 2001 |
| 6,206,293 B1 | Gutman et al. | Mar. 27, 2001 |
| 6,223,984 B1 | Renner et al. | May 1, 2001 |
| 6,257,486 B1 | Teicher et al. | Jul. 10, 2001 |

U.S. Pat. No. 4,614,861 issued to Parlov et al. in 1986 discloses a unitary, self-contained credit card which has the ability to verify a personal identification number (PIN) which is entered directly into the card by way of a keypad without the use of an outside terminal. Furthermore, a transaction identification code (TIC), which varies for each transactional use of the credit card, is automatically generated for later transaction validity verification after a valid PIN is entered and accepted by the card. While the idea of such an all-encompassing card advanced at the time was indeed novel in its capability of eliminating unauthorized or fraudulent use by individuals other than the cardholder, it suffers from a number of drawbacks judging from today's technological and utilization viewpoints. First of all, this card is too complex to use and too expensive to manufacture in view of number of components that need to be incorporated onto the card. Second, the microprocessor used was not a modern-day smart chip with the level of security absolutely required by all today's card-issuing banks. Finally, the card system is incompatible with existing magnetic stripe financial card transaction infrastructure and merchants who opt to use such a system must invest in new and expensive equipment in order to reap the system benefits. Consequently, such a credit card system has not achieved a widespread level of acceptance and usage by the general public.

U.S. Pat. No. 4,701,601 issued to Francini et al. in 1987 discloses a new and improved transaction card having a magnetic stripe emulator which can interface with the sensor or reader head of existing transaction terminals (magnetic card readers). A transducer means is provided to generate a varying magnetic field that extends beyond the surface of the transaction card. Such transducer means were claimed to be either a thin film head or an electromagnetic coil.

For the thin film head used as the magnetic stripe emulator, no description nor explanation was put forth by this patent as to how this device would function as a magnetic stripe emulator, not even in a very simple language. Instead U.S. Pat. No. 4,437,130 issued to Hennessy in 1984 for a device receiving multiple eight-track tape cartridges was cited as an example. But in actuality if a thin film head could somehow be successfully implemented on the surface of the transaction card, the only varying magnetic field that could be generated is perpendicular to the card surface and hence useless in emulating the magnetic field transitions encoded in a magnetic stripe, which is parallel to the card surface.

For an electromagnetic coil claimed to be usable by this patent as a magnetic stripe emulator, no description was put forth as to how this device would function as such. Consequently no working transaction cards advanced by this patent have ever surfaced because the claims of this patent have never been satisfactorily supported by the disclosure of a viable or demonstrable embodiment.

U.S. Pat. No. 4,786,791 issued to Hodama in 1988 discloses a data card using a simulator for magnetic stripes in generating a data signal. The data signal is generated by the use of a magnetic coil having a drive signal provided to it by a circuit on the card which simulates the magnetic flux reversals of the magnetic stripes. This is a very important prior art invention in that the inventor was the first one to recognize the fact that many different types of cards are in use today and much equipment is installed for reading the magnetic strips on the cards. Consequently any new card, in order to be practical, should maintain compatibility with the existing magnetic card equipment. As the magnetic stripe simulator, the inventor uses a coil consisting of about 80 turns of wire having approximately 0.006" diameter and wound on a high permeability magnetic core material such that both the core and the windings are embedded in the card. The inventor further uses a circuit means for providing a drive signal having logic one and logic zero data values to the coil for generating a bit pattern which correctly simulates the magnetic flux reversals encoded on the magnetic stripe provided to the magnetic card reader.

U.S. Pat. No. 4,791,283 issued to Burkhardt in 1988 discloses a device and method for transferring data from a microprocessor located in a transaction card through a card reader by emulating a prerecorded magnetic stripe on a conventional transaction card such as a credit or debit card. Data is sequentially produced by the microprocessor within the card and applied to a "magnetic field generator" which produces magnetic fields that emulate prerecorded data on a conventional stripe of a transaction card. While the "magnetic field generator" of this invention does not require any specially designed magnetic card reader for data transfer, the device itself is extremely complex involving multiple integrating circuit processing steps for its fabrication. The overall cost for setting up such needed custom tooling and special processing equipment together with the delicate precision process development itself is staggering. This is probably the reason why such a "magnetic field generator" has never surfaced for use in the financial card transaction arena since its inception over 13 years ago.

U.S. Pat. No. 4,868,376 issued to Lessin et al. in 1989 discloses a general-purpose re-programmable intelligent transaction card. The card includes an alphanumeric keypad, an alphanumeric display and one or more input/output ports controlled by a microprocessor and programs stored in a memory associated with the microprocessor. The microprocessor is provided with an operating system and may be programmed or re-programmed for a specific application for a variety of applications. While the card can serve multiple functions, it suffers from several drawbacks that prevent it from being widely accepted by the bank community and the general public. These include its complexity in use, its innate incompatibility with the existing credit card transaction infrastructure and the resultant high cost of the card itself.

U.S. Pat. No. 5,130,519 issued to Bush et al. in 1992 discloses a portable Personal Identification Number (PIN) card which allows a user to enter a PIN code at a location remote from an authorization terminal. The PIN number is entered into volatile RAM and will remain active for some finite period of time. The PIN, along with a random number input from a remote computer is processed through a code matrix contained within the card to generate an image of the PIN (CGPIN), which can be compared at either the authorization terminal or at a remote computer.

A German publication No. 42 02 998 (1993) discloses a plastic 'smart' card which has a built-in coil located on the card in the position occupied by a magnetic strip on ordinary cards. The data contained in the memory of the smart card may be read using an inductive coupling between the coil and the head. The supply to the coil is provided by the electronic circuit chip of the smart card. The timing of the signals corresponds to that of a magnetic strip. No details were put forth as to what kind of a coil it is, whether it has a magnetic core, if so, what are the characteristics of it. Also there is no disclosure as to how this coil can inductively output the data stored in the memory of the smart chip or what kind of circuitry will be needed to achieve such a function. In any event, the essential teaching of this disclosure had been advanced earlier in U.S. Pat. No. 4,768,791 issued to Hodama in 1988.

U.S. Pat. No. 5,317,636 issued to Vizcaino in 1994 discloses a method and apparatus for secure credit card transactions. This invention describes a system apparatus used to authorize credit card transactions. This apparatus is made up of an authorization computer and a credit card that work in conjunction with each other to enhance the security of credit card transactions. More specifically, the system includes a smart credit card that has a microprocessor, associated memories and a liquid crystal display. The credit card is used to produce a unique verification number by processing a transaction sequence number with an encryption algorithm. The verification number is then displayed in the display device, and can be transmitted to the authorization computer along with a customer identifying account number. The computer, which is used for authorizing the credit card transactions for the customers of the credit card issuer, uses the account number to access an account file for the credit cardholder. That account file has the general account data for the given customer, as well as a transaction sequence number, which corresponds to the transaction sequence number stored in the credit card. Additionally, the account file contains a de-encryption algorithm, which is complementary to the encryption algorithm of the credit card, such that the computer can use the de-encryption algorithm together with the verification number to produce a computed transaction sequence number.

The computed transaction sequence number is compared with that stored in the computer to determine whether the two numbers correspond to one another. If they do, then the computer will authorize the transaction, and if they do not, then the transaction will be rejected.

Both transaction sequence numbers, the one in the card and the one in the computer, are changed by increment after the authorized transaction so that a different verification number is generated and used in the authorization in each subsequent credit card transaction. In other words, the verification number used in one particular transaction will not be useful again in a subsequent transaction.

This invention advances a viable methodology for preventing unauthorized usage for credit card transactions. However, such a methodology has several drawbacks. One drawback is that crucial information pertaining to the cardholder and the encryption algorithm are not stored in the memory of a secure microprocessor like the modern-day smart chip and consequently they are vulnerable to electronic piracy. Another drawback is that since the credit card number and the verification number generated for each transaction are both visibly made available to the merchant so that they can be sent for authorization, once the content of the card is illegally obtained, it would be difficult to safeguard against subsequent large scale fraud. Yet another drawback is the fact that transmittal of the encrypted verification number, which is an alphanumeric number comprising 14 or more characters, rather than the common 4-decimal-digit PIN, along with the user identifying credit card number, is not compatible with existing credit card transaction infrastructure. This represent a major roadblock for such system methodology to be widely accepted by the financial community.

U.S. Pat. No. 5,434,398 issued to Goldberg in 1995 discloses a "magnetic smart card" which takes advantage of the secure microprocessor of the smart card and also renders it compatible with the existing magnetic card readers. Two specific embodiments of this invention were advanced. The first one is a standalone magnetic smart card comprising a card base, a power source, a secure microprocessor which generates a modulated output corresponding to pre-selected card information, a ferromagnetic element embedded in the card base and arranged such that a portion of the element is positioned at a location suitable for interfacing with a magnetic card reader, and an inductor operative to induce in the ferromagnetic element a modulated magnetic field corresponding to the modulated output generated by the embedded microprocessor.

The second embodiment of Goldberg's invention provides a portable, smart magnetic interface device for use with at least one magnetic card having a magnetic strip. This device is equipped with a housing, a power source, a secure microprocessor which generates an output corresponding to pre-selected card information, a slot associated with the housing suitable for accommodating the magnetic card, and a magnetic head associated with the slot and arranged to operatively engage the magnetic strip when the magnetic card is inserted into the slot for inputting or erasing information from the said magnetic strip.

Although inventor Goldberg (U.S. Pat. No. 5,434,398) clearly had the right idea, like inventor Hodama (U.S. Pat. No. 4,786,791) in taking advantage of the secure smart chip to combat frauds and identity thefts while maintaining the usage of the existing magnetic card transaction and processing infrastructure for cost and merchant acceptance considerations, the teachings of this patent have several shortcomings. First, let us consider the patent's first embodiment. In the arena of financial cards, unit card cost to the issuers is exceedingly important and this invention's "magnetic smart card" is expensive. Second, unlike Hodama's teaching in U.S. Pat. No. 4,786,791 (1988) on how the simulator for the magnetic stripe should work and be implemented, inventor Goldberg's explanation in how his "inductor" operates is unclear and imprecise. Finally, even though this is a "magnetic smart card", apart from the fact that it works with a conventional magnetic card reader, it does not work with a smart card reader. As for the second embodiment put forth by the inventor, there is no perceived advantage over the first embodiment. The portable, smart, magnetic interface device is equally costly if not more so than the standalone "magnetic smart card".

U.S. Pat. No. 5,789,732 issued to McMahon et al. in 1998 discloses a consumer data device of a plastic encased, credit-card sized case containing a memory for data and transaction retention, an LCD display for displaying information, an LCD display for bar-codes to be read by a bar-code scanner, a controller to scroll through stored information, and a data communication link via spread-spectrum RF or direct electrical contact to a host computer. Although many of the elements advanced by this invention have potentials for exploitation in the design and implementation for future financial cards, this prior art is not as useful as others and its inclusion is primarily for the sake of completeness only.

U.S. Pat. No. 5,955,961 issued to Wallerstein in 1999 discloses a programmable transaction card which enables accessing a selected one of a plurality of different accounts with the same or different financial institutions through communication with an authorization center while providing important anti-fraud features. The transaction card includes a keypad for selecting a desired account and for entering optional identification information for the card. The transaction card generates an account number corresponding to the selected account. The account number, together with the identification information, if entered, is presented in a form that is readable by a reader device but is not discernable by the human eye, e.g. by emulation of a magnetic strip or an optical pattern. After a reader device (magnetic or optical reader) reads the account number and the identification information during a transaction, the account number and the identification information are transmitted to the authorization center for verification and access to the selected account.

In order for this transaction card to perform all the above-mentioned chores, it has to pack away so many features and devices in the card that it becomes overly cumbersome and complicated to use for an average consumer. For example, the incorporation of the feature of being able to select from a plurality of different accounts necessitates the use of an awkward thumb-wheel switch on the card, which is very user-unfriendly. The same applies to the situation when tonal identifying controls are added to the card, which will certainly make the latter even more complicated to use. But the most significant disadvantage of this invention is the high cost for producing the card which is the most critical and sensitive criteria for card issuers to consider before adopting the use of any card for their customers.

On the technical side, the inventor of U.S. Pat. No. 5,585,787 did not disclose the details how he envisions the use of an inductor coil for generating a time-varying magnetic field that appears to the card reader as if a conventional magnetically encoded card had been "swiped" through the reader head Instead he cited the embodiment of an analog drive circuitry described in U.S. Pat. No. 4,868,376 issued to Lessen et al. in 1989 as an example of accomplishing such a feat. However, no details were expounded in the cited U.S. Pat. No. 4,868,376 as to the exact nature of the coil, its magnetic properties such as its core composition and permeability, number of winding turns per inch, length of the winding coil etc. Furthermore no mention was made to Hodama's magnetic stripe simulator (U.S. Pat. No. 4,868,376) which is clearly an important prior art.

U.S. Pat. No. 6,089,451 issued to Krause in 2000 discloses a transaction card system for authenticating the use of transaction cards having a magnetic stripe. The system involves the use of a card possessing a non-standard magnetic stripe. Specifically the magnetic stripe disclosed has a coercivity approximately an order of magnitude lower than the 300 oersteds value for a standard low coercivity magnetic stripe card. The card receives input from a user and determines if the input is valid. If the user's input is valid, the card responds by enabling said non-standard magnetic stripe thereon. The magnetic stripe is enabled for a limited time after which it is disabled. In this patent, the inventor discloses a transducer which can convert electrical energy supplied by the energy source into magnetic energy which can write data to the magnetic stripe in a predetermined format. By passing just a single current through a "circuit of wire", magnetic fields can be produced in designated locations along the magnetic stripe so as to simulate digital data encoded on same.

There are two basic drawbacks in the above disclosed embodiment. First, in order to generate strong enough magnetic fields to "encode" digital data onto the magnetic stripe using just a single continuous wire forming a "circuit" or desired spatial pattern, a large current, typically several amperes, has to be deployed. Thus from the consideration that only a limited capacity energy source is available onboard the card, the standard low coercivity magnetic stripe (300 oersteds) is too high for use as the magnetic storage medium for this disclosed embodiment. Instead, a much lower coercivity magnetic stripe having an "ideal" coercivity of only 30 oersteds must be used. The use of such a low coercivity magnetic stripe cannot guarantee the integrity of the dynamically encoded digital data for card transaction purposes, even though it may only take a few minutes in most cases to complete a transaction. Second, the transducer disclosed can only "encode" one particular digital data package (equivalent to one credit card's worth) onto the non-standard magnetic stripe because the so-called "wire circuit" or the spatial pattern of the wire is fixed and is therefore invariant. No details were put forth in the disclosure as to how to render this transducer capable of "encoding" different digital data packages at different times on demand onto the non-standard magnetic stripe. The only skeletal teaching was afforded as "coils of wires, multiple current carrying conductors together, printed circuits, etc. all may serve to task without deviating from the objective which is to convert electrical energy into magnetic energy in a spatially distributed manner."

U.S. Pat. No. 6,095,416 issued to Grant et al. in 2000 discloses an authorized card, such as a credit card, having a security feature. The authorization card generally has two operational states, a disabled state and an enabled state. In the disabled state, which is the default mode of operation, access to confidential information stored on the card is denied. The card remains in the disabled state until a PIN code is entered on a keypad provided on the card. Once the card is enabled, access to the confidential information is permitted for a predetermined period of time, after which the card reverts back to the default disabled state. Such a security feature could be implemented on a magnetic card, an electronic smart card, and passive electronic card.

U.S. Pat. No. 6,188,309 B1 issued to Levine in 2001 discloses an intelligent credit card which includes a keypad for inputting numbers and other information, a processor for controlling the operation of the credit card, a power source, and an output device for selectively outputting the credit card number when the card is activated. The output device is a magnetic strip. A user inputs a sequence of numbers using the keypad. The received sequence of numbers are compared to a stored PIN number if the sequence of numbers matches the PIN number, the card is activated, and the credit card number is outputted using the output device.

U.S. Pat. No. 6,206,293 B1 issued to Gutman et al. in 2001 discloses a magnetically communicative card having a ferrite core extending substantially the width of the card body and has a conductor wound around the ferrite core for the entire length of the ferrite core. Embedded within the card body is a controller that controls a varying magnetic field emanating from the conductor to mimic a varying magnetic field produced by a conventional magnetic stripe card. Optionally, the card includes a sensor to sense a signal intercepted by the conductor from a varying magnetic field emanating from another device. The controller reads the sensed signal to receive communication from the other device.

U.S. Pat. No. 6,223,984 B1 issued to Renner et al. in 2001 discloses an intelligent card reader to replace existing magnetic stripe readers, bar code readers, and Wiegand effect readers without the need for expensive retrofitting of existing computer systems which are coupled to the existing readers. The intelligent card reader can replace the aforementioned readers and yet remain compatible with their existing interfaces by emulating a magnetic card reader, a Wiegand effect reader, or a bar code reader.

U.S. Pat. No. 6,257,486 B1 issued to Teicher et al. in 2001 discloses a smart card, smart card reader, and system for secure entry of a secret personal identification number (PIN) directly into the smart card while the card is presented to the reader. Because the user's PIN is entered directly into the smart card itself, and not propagated outside the smart card, the PIN cannot be covertly obtained through the use of a compromised reader or other device in the system. A PIN keypad on the smart card allows user entry of the PIN, and an authentication unit within the smart card verifies that the PIN is correct. The reader merely supplies electrical power for the smart card to take the PIN entry and perform the authentication, but does not handle the PIN itself in any way. The reader, however, is designed to allow access to the keypad on the smart card while the smart card is being presented. The reader may also have a separate keypad of its own for use with conventional smart cards that lack a keypad.

Examples of Group II prior art inventions relating to advancement of new methodologies in the processing and transaction systems for financial cards are disclosed in the following patents:

| U.S. Pat. No. | Inventor | Date |
| --- | --- | --- |
| 4,650,978 | Hudson et al. | Mar. 17, 1987 |
| 5,627,355 | Rahman et al. | May 6, 1997 |
| 5,754,652 | Wilfong | May 19, 1998 |
| 5,844,497 | Gray | Dec. 1, 1998 |
| 5,917,168 | Nakamura | Jun. 29, 1999 |
| 6,075,861 | Miller II | Jun. 13, 2000 |

U.S. Pat. No. 4,650,978 issued to Hudson et al. in 1987 discloses a rather complicated "bank" cash card system for handling fund transfer transactions between a payor and a payee having a magnetic "hysteresis" security arrangement. A cash card has a magnetic stripe on which the available cash balance, the identification and security information are scramble-recorded. A transaction register machine reads data form the card, carries out the transaction and records the new account balance on the card. The modified information is restored on the card in the form of a re-scrambled code. The transaction register machine also includes a magnetic tape of the cassette type or disk for storing each transaction thereon for further processing of the information at a remote data processing center. The transaction register machine further includes a main keyboard on the side of the payee for displaying the cash balance on the card. The main keyboard is responsive to the to the cardholder's keyboard which has a slot for insertion of the card for verification by entering the correct identification number known only to the cardholder. Again, the complexity of such a system, together with its inherent incompatibility with the existing magnetic credit card transaction infrastructure, has proved to be too much of a barrier for the system to be widely accepted and implemented by the financial community.

U.S. Pat. No. 5,627,355 issued to Rahman et al. in 1997 discloses a security equipment protecting the relaying of account numbers and personal identification numbers (PINs) by telephonic or other communication link. This equipment includes a host computer and a remote portable transaction device that interact with one another. A credit granting institution generates an account number and a series of unique personal identification numbers for each account number. This information is stored in the host computer's memory and is assigned as a reference series to an individual customer account number. An identical series of numbers in the same sequence is stored in the memory of the remote device. In operation, the customer account on the host computer is activated and the host computer's memory is indexed sequentially to the first number in the reference series. During use of the remote device, a unique personal identification number is added to the customer account number and transmitted to the host computer. There it is compared to the account number and personal identification number in the reference series. The computer will authorize the transaction if the number in the stored series is identical to the number in the reference series; otherwise the transaction will be denied or questioned.

The method advanced in U.S. Pat. No. 5,627,355 for preventing theft of credit information, in particular the personal identification numbers (PINs), has a number of operational disadvantages. In this patent's teaching, the credit card number is always visible for use by anybody getting hold of the card. This number, along with a special PIN visibly generated on command on the card which varies sequentially in synchronism with the issuer from transaction to transaction, must be passed on to the credit granting institution for authorizing the transaction. Even though the PIN is unique for each transaction, there is nothing to prevent anyone in possession of a stolen card from sequentially generating the right combination of the PIN and account number, even though it might take some time to successfully carry out an unauthorized transaction.

Furthermore, it is operationally questionable whether or not the method taught in U.S. Pat. No. 5,627,355 is actually scaleable. Because the host computer has to store so many PIN numbers (literally hundreds for each customer alone that has multiple credit cards form different issuers), access time and memory capacity of the host computer may become critical parameters in terms of whether the processing system will function smoothly as the number of cardholders continues to grow. The same problem might surface when occasional but unavoidable system glitches take place due simply to too much load or demand for card approval or reconciliation.

U.S. Pat. No. 5,754,652 issued to Wilfong in 1998 discloses a method for sequentially encrypting the digits of a personal identification number, and an apparatus for practicing the method. According to the method, a random number is generated and supplied to a user requesting access to a system. The user encrypts a digit of his personal identification number by performing a function on the random number and the digit and then provides the encrypted digit to a verification system. A second random number is then generated, provided to the user, applied to encrypt another digit of the user's personal identification number and then input to the verification system. The dialogue between verification system and the user continues, digit by digit, until each digit of the personal identification number has been provided to the verification system in encrypted form. The verification system then compares the encrypted input with the user's personal identification number accessed from memory.

U.S. Pat. No. 5,844,497 issued to Gray in 1998 discloses a method and apparatus for controlling access to at least one program on a computer by verifying data entered through a keyboard with data stored on a token such as a card, while isolating the entered data from the computer. The apparatus includes a verification device, external to the computer, which receives the entered data and compared it with data stored on the card. The verification unit then generates a status signal indicative of the result of the comparison, the verification device is operable in a first mode wherein data provided to the verification unit via the keyboard is not provided to the computer. The verification device is also operable in a second mode, wherein at least one program on the computer is accessible via the keyboard when the data from the keyboard matches the data from the card. When operating in a third mode, communications are restricted to that between the verification device and the computer. The verification device operates in one of the three modes in accordance with commands from the computer.

U.S. Pat. No. 5,917,168 issued to Nakamura et al. discloses a terminal for carrying out at a private location a transaction consisting of alteration of a token value stored in an IC card issued to a cardholder via an on-line transaction session with an operatively compatible terminal at a remote location. The private terminal establishes data links with the IC card and the remote terminal and passes secure authentication and transaction messages between them via these data links, relying on the IC card and the remote terminal for message security.

U.S. Pat. No. 6,075,861 issued to Miller II in 2000 discloses an entry access system includes a locking mechanism enabling authorized entry at a secured entry point to a closed access area or computing device. Entry is approved in response to an interaction between an intended entrant and the entry access system that involves an interchange of multi-digit numbers and use of ID and PINs for generation of a multi-digit check number to establish authenticity of a request for entry.

Examples of Group III prior art inventions relating to the advancements of card systems hardware encompassing new technologies in electronic components, devices and subsystems are disclosed in the following patents:

| U.S. Pat. No. | Inventor | Date |
| --- | --- | --- |
| 4,742,351 | Suzuki | May 3, 1988 |
| 4,849,613 | Eisele | Jul. 18, 1989 |
| 5,770,849 | Novis | Jun. 23, 1998 |
| 5,818,030 | Reyes | Oct. 6, 1998 |
| 6,010,066 | Itou et al. | Jan. 4, 2000 |
| 6,012,636 | Smith | Jan. 11, 2000 |

U.S. Pat. No. 4,742,351 issued to Suzuki in 1988 discloses an IC (integrated circuit) card system of the type in which IC cards are identified when they are connected to an external device such as a terminal. When an IC card is inserted into an IC card terminal, the PAN (primary account number) data read out from the IC card is compared with the decrypted PAN data for identification purposes. Then, the IC card is removed from the terminal. The PIN data input to the IC card is compared with the PIN data pre-stored in the IC card, the results of the comparison are used to identify the validity of the IC card, the terminal, and the card owner.

U.S. Pat. No. 4,849,613 issued to Eisele in 1989 discloses a methodology and equipment of an operating procedure and to a device for making an electronically authorized determination of a matter as well as to a computer device for implementing the operating procedure. The objective is the electronically authorized determination of an individual matter and the remotely authorized individual differentiation of a transaction authentication requiring on the part of the authorized person. With the exception of the authentication concept, this prior art has very little to do with the operation and processing of financial cards and is included here for the purpose of completeness.

U.S. Pat. No. 5,770,849 issued to Novis et al. in 1998 discloses a smart card device including a portable housing with a viewing aperture and a visual image display positioned to provide an image at the aperture of information contained on a smart card as well as transactions processed in response to data transmitted by a transceiver between a host database and the smart card device. The primary purpose of this invention is to provide new and improved apparatus for viewing and utilizing information stored on a smart card. This prior art is also included in the current disclosure for the sake of completeness.

U.S. Pat. No. 5,818,030 issued to Reyes in 1998 discloses a secure, smart credit card having the same basic dimensions of a standard credit card. This invention provides a security system that uses the concept of a key, which, when removed prevents unauthorized use of the card. The so-called dual device system has tow parts. A first part is a microprogrammable central unit (CPU) in the main body. The second part is an engageable intelligent micro-memory module that functions as a key unit and is configured to join the main body to form an engaged unit having the general dimensions and appearance of a "smart credit-type card." The CPU of the main body and instructions are designed to operate in conjunction with the external intelligent micro-memory module or key unit. The key unit stores the programs and date required by the processor CPU in the main body to allow the user to operate the credit card system. Although such a credit card system has the ability to help prevent unauthorized or fraudulent use, it is unlikely that this system will be widely accepted in the financial community because of its operational complexity from the user's standpoint, and its questionable compatibility with the prevalent credit card transaction processing infrastructure.

U.S. Pat. No. 6,010,066 issued to Itou et al. in 2000 discloses a portable terminal device in which electronic money IC (integrated circuit) cards storing electronic monetary information are inserted, and with which the electronic monetary information can be read out and/or written into the cards. One of the primary objects is to provide a portable terminal device for electronic money IC cards, hitherto unavailable, into which at least two electronic money IC cards can be inserted and with which monetary data of them can be transferred to and/or exchanged with each other.

U.S. Pat. No. 6,012,636 issued to Smith in 2000 discloses a multiple application card data system comprising a data management device and a user card (a dual component system). This credit card system is, by design, complicated. A user can carry a single card that may be modified at will to be, in effect, a clone for any one of the user's provider data cards, through the use of a companion data management device that can store data from a plurality of provider data cards. However, the system requires a user's interaction in order to transfer data from the data management device to the user card. In addition, the data management device also stores a digital data representation of the user's fingerprint for verifying the user's identity when compared with an actual scanning of the user's fingerprint image by the same device during the process of authentication. Thus, the user's identification verification is by no means a simple procedure. Furthermore, the user card itself comprises two memories for storing data, the first memory stores data issued by a service provider and the second memory stores a set of data unique to the user. Before the user's scanned fingerprint image can be used for identification purposes, the data management device must first verify the data contents of the two memories resident on the user card without even raising the issue of the questionable public acceptance today with regards to using fingerprint imaging as a form of personal identity, the procedures the card user must endure in order to safeguard the card's security against unauthorized use are far too complicated. It is believed, as advanced in the current invention below, a much simpler and much less costly card system that will work just as well against unauthorized fraudulent use identity thefts of financial cards.

In examining and analyzing the exhaustive prior art presented above in finance cards, their transaction and processing methodologies and new equipment and subsystems, it counters one's intuition and logic to observe that each of the prior art inventions to date addresses the overall card security problem mostly from a very narrow point of view. Not one single prior art patent tackles the problem of today's credit card frauds and identity thefts (at least for magnetic cards) using a total picture approach that takes into considerations the real issues and needs for the solution of this problem. Very simply, one can describe the current total picture as follows. Credit card frauds and identity thefts are still rampant today in the United States with no sign of abatement. One solution clearly has stood out for adoption over the past several years and that is the use of smart cards in lieu of the magnetic cards. However, due to the colossal cost of replacing existing magnetic card readers and the needed retraining of workers from the standpoint of the merchants, and the proven slow acceptance of new monetary device and equipment by the conservative American public (e.g. the ATM cards), the smart card solution to date has simply not been working. It is amply clear that a new and novel device and methodology is urgently needed that can serve as a "bridge" to link the world of the magnetic cards to that of the smart cards. However, such a device and methodology must afford very low unit cost cards and very low unit cost accessories (if needed). Furthermore, this novel device and method must possess a very high efficacy of eliminating finance card frauds and identity thefts. They must be very simple and easy to use without any appreciable resistance from both the merchants and the consumers. Finally, this novel device and methodology must be technically sound and have no measurable risk in both its implementation and fast-track adoption by the general public. The current invention in the Magnetic Stripe Bridge (MSB) is just one such device and methodology.

OBJECTS AND SUMMARY OF THE INVENTION

It is therefore a primary object of the present invention to provide improved methods and systems for linking the attributes of smart cards to those of the existing magnetic stripe card infrastructures.

A further object of the present invention is to provide a unique bridge device to accomplish the functional linking of 'naked' smart cards to the magnetic stripe (or strip) card infrastructure to provide additional levels of security to the linking process by virtue of a transaction number generator carried within the smart card.

The objective of the present invention is to take advantage of the secured characteristics of smart cards to devise a methodology with associated hardware that would eliminate magnetic card frauds and identity thefts. More precisely, such a scheme acts in effect like a "bridge" that would link the world of the vulnerable magnetic financial cards with that of the secured smart cards. With the use such a "bridge", one can take advantage of the secured attributes of the smart financial cards while still be able to use the existing magnetic financial card transaction and processing infrastructure to eliminate the need for expensive reader replacement, personnel retraining and most of all, to be accepted by the conservative American public with minimum resistance.

Another objective of the present invention is to extend the usage of this "bridge" whereby other extremely sensitive and vital personal information such as one's medical records, names of one's physicians and names of relatives to notify in case of emergencies, insurance policy number etc. can be securely stored in the smart chip of the same financial card. This private and vital information could be made available to relevant authorized individuals such as ambulance operators or emergency care center personnel. If the ambulances and emergency care centers are equipped with relatively inexpensive magnetic card readers that can read vital data from track 3 of the magnetic strip, and by a priori arrangement they have access to one's medical PIN number for track 3, then in the case of an emergency, one's vital medical records can be made readily available for use by the healthcare personnel. In certain circumstances that could mean the difference between life and death for an individual.

The present invention has to do with a novel "bridge" device and methodology that couple or link the world of the smart cards to that of the magnetic credit cards as discussed earlier above. As its name implies, this device is called the "Magnetic Stripe Bridge" or MSB The main function of the MSB is to interface the smart card after authentication by same to a magnetic card reader for credit transaction and processing. As such any smart card is effectively transformed via the use of the MSB instantly into an ordinary magnetic credit card and admissible for use by any existing magnetic card reader.

The Magnetic Stripe Bridge is arranged as a plastic encased, credit-card sized case. It houses an electrical power source, a microprocessor, a ten or more digits alphanumeric LCD display, a 16-characters keypad, a contact pad for electrical interfacing with the smart card upon proper registration and a magnetic stripe simulator in the form of a flat multi-turn wire-wound coil with a similarly-shaped high permeability magnetic core. A card slot is located on the top right hand side of the housing for accommodating the horizontal insertion (from right to left) of a smart card. In a preferred embodiment of the present invention, the bottom one-third of the housing (~1.00") is a thin section with a thickness roughly the same as a conventional magnetic credit card or 0.033". The magnetic stripe simulator is centrally embedded in this thin section and approximately 0.40" from the bottom edge. This thin section arrangement for the case allows the MSB (with or without the inserted smart card into its side) to be centrally inserted from the top into any magnetic card reader with the magnetic stripe simulator properly engaging the reader head.

Consider now briefly the overall operation of the MSB into transforming a regular smart card instantly into a card (magnetic) that is admissible for transaction and processing by a conventional magnetic card reader. A smart card is first inserted into the MSB through a card slot located on the right hand side of the case housing. A proper insertion will activate via a contact switch or software provision the microprocessor-controlled circuit inside the MSB while at the same time bring the smart card contact pad into registration with the corresponding springy contact pad inside the MSB and thereby powering up the smart chip of the smart card via the MSB battery.

The microprocessor inside the MSB (hereby referred to as the MMSB) initiates an ATR communication with the smart chip according to the standard ISO 7816 protocol. After the communication is properly established, the MMSB effects a ""ENTER PIN"" message on the LCD of the MSB. The smart card cardholder is requested to enter his or her 4- or 6-digit PIN number using the keypad on the MSB. The MMSB then communicates this information to the smart chip for verification. After the smart chip verifies this PIN number to be valid, it sends over to the MMSB all the magnetic stripe track 2 data information plus a 3-digit transaction number. After that the smart card has nothing more to do and can be pulled out of the MSB card slot for safekeeping.

Upon correctly receiving and storing all the transaction data information from the smart chip, the MMSB effects another message "OK 4 READER" on the LCD. At this point the MSB takes over the role as the "magnetic-card-reader-admissible smart card". The merchant or sales clerk can now treat the MSB as if it is a valid magnetic credit card transformed from the smart card. In one preferred embodiment of the MSB, the merchant can simply swipe the thin section of the MSB through the magnetic card reader and the transaction will be put through to the existing magnetic card processing infrastructure for any conventional magnetic credit card. In another preferred embodiment of the MSB, the merchant can simply place the thin section of the MSB into the slot of the magnetic card reader from the top and approximately centers it in the middle of the reader where the reader head resides. He then pushes one of the designated keys on the keypad of the MSB to begin the transaction.

In either of the two preferred embodiments of the MSB described above, the merchant can "swipe" or "center and push button" the MSB several times just like he is handling an ordinary magnetic credit card.

In the event that the smart card cardholder's PIN number is not valid, the smart chip automatically keeps account of how many consecutive times an invalid PIN number is being tendered. Every time the smart chip rejects a tendered PIN to be invalid, that information is relayed back to the MMSB. At which point the MMSB will effect a "TRY AGAIN" message on the LCD display. After three, illustratively, consecutive times of an invalid PIN number being tendered to the smart chip for verification, the smart chip will no longer verify any additional PIN numbers and it will take itself out of the service. Meanwhile the MMSB will effect a "INVALID PIN" on the LCD display and shuts itself down and leaves the LCD display blank. However, to re-activate the MSB after its shutdown, one simply has to pull out the smart card (if it is still engaged with the MSB) and re-insert it to resume operation. If the smart card has already been pulled out of the MSB, one simply re-inserts the smart card again to achieve the same result.

One of the greatest advantage of the current invention of the Magnetic Stripe Bridge (MSB) and its methodology is the fact that it leaves both the old magnetic card world and the new smart card world virtually undisturbed. The present invention merely serves as the vital "bridge" that links these two worlds together in order to achieve the heretofore almost impossible task of convincing the cost-conscious merchants and the conservative American consumers to buy in on the secure smart card technology in a much shorter time frame. It is important to point out that the cardholders themselves do not have to carry the MSB with them. Rather, it is only the merchants, if they care to do new smart card business, that need to have the MSB ready for the new smart cards using their old magnetic card readers.

Even more importantly, the present invention is one that is easily affordable by both the card-issuing banks and the merchants. First of all, the burden of the meager cost for the MSB (only a few US dollars when manufactured in millions quantity) is not borne by the issuing banks nor by the cardholders. When the issuing banks decide to issue smart cards in lieu of the traditional magnetic cards, the incremental cost is relatively small, estimated to be less than US$ 0.50 per card. However, by issuing these secure smart cards, the issuing banks stand to reap huge financial benefits in fraud reduction and in the scaling down of personnel counts needed to service the growing fraud complaints from customers and merchants alike.

For the cardholders, if there is no fee increase or other charges, there is an excellent chance that they will buy in on the new smart cards just because they no longer have to worry about losing their cards that could lead to frauds and identity thefts, not to mention the many new smart card features, e.g. the storage of their own vital personal medical record on the same smart card, that they now can enjoy and take advantage of.

From the merchants' standpoint, it is for them really a matter of practicing good business. For the investment they have to put up (in most cases a handful of MSB's at a few dollars each), not only will they not lose new smart card business, they also are in line to reap the financial benefits and time savings with the issuing banks because of the overall fraud reduction of credit cards.

We have mentioned earlier that the present invention literally will leave both the magnetic card world and the smart card world undisturbed. It is relatively easy to have a smart card mimic a conventional magnetic card. All one has to do is to have the track 1 and track 2 data for a card belonging to a particular cardholder stored in the EEPROM (Electrically Erasable Programmable Read Only Memory) of the smart chip. We mentioned earlier that after the smart chip verifies the PIN of the cardholder to be valid, it sends the track 2 data over to the microprocessor of the MSB (MMSB) to be transmitted subsequently to the magnetic card reader for transaction processing. In addition it also sends over a 3-digit transaction number which is automatically updated by the smart chip every time it verifies a valid PIN number and sends over the track 2 data belonging to the cardholder. Thus the track 2 data processed for every valid transaction for the card is actually dynamic. In other words the valid credit card number of the cardholder is always accompanied by a variable 3-digit transaction code. Only the issuing bank would know the algorithm governing the updating of this transaction number every time the cardholder legitimately uses the card. Therefore, even though the cardholder's name and valid credit card number can be embossed on the smart card like any conventional magnetic credit card, skimming of this information from the card is insufficient to commit a fraud against the cardholder because of this dynamic 3-digit transaction number. What we have shown here is just one embodiment example in the methodology of the present invention. Other anti-fraud schemes can be implemented and used in coordination with the smart chip including those currently used by most issuing banks.

Another equally important advantage afforded by the present invention is the very low technological risk associated with the realization of the MSB. Unlike many prior art inventions listed and discussed above that require implementing more and more components and features onto the card (magnetic or smart types alike), both the technological complexity and their unit production cost will correspondingly and significantly rise. But even more worrisome is the reliability issues for these cards and their ability to meet the stringent ISO compliance standards, both in whether they will be able to actually meet such standards and how long it will take them to do so. For the present invention, we are dealing only with the so-called "naked" smart cards, i.e. cards that have only the smart chip on them and nothing else. These "naked" smart cards have been reliably manufactured in millions during the past 2 decades. They all have no problems to date meeting the stringent ISO compliance standards for smart cards.

As far as the MSB itself is concerned, with the exception of the magnetic stripe simulator, which has excellent demonstrable prior art, most notably U.S. Pat. No. 4,786,791 (1988) issued to Hodama, the other components are routine and the complexity of the MSB unit less the simulator likens to nothing more than just a credit-card sized calculator which has been produced in the millions with extreme cost effectiveness since the 1960's. Furthermore Hodama's "magnetic stripe simulator" prior art invention has been greatly improved in efficacy and reliability by the present inventor. The prior art analog circuit for driving the coil has been replaced with a microprocessor for achieving more precise and more energy-efficient driving. The coil itself is now wound with smaller diameter (0.003") and much better insulated wire for achieving an even more compact and closer-spaced winding for the coil. As a result of these improvements to the "magnetic stripe simulator", the MSB of the current invention can be readily produced in very large quantities and at a very low unit production cost.

Finally, another significant advantage of the present invention lies in the fact that the MSB and the accompanying methodology not only links the two worlds of finance cards together in forging the smart card forward, it also allows the usefulness of the magnetic card to expand into new and much needed areas by exploiting the secure attribute and superior capability of the smart chip, and also the popularity, ubiquity and trust by most Americans in the magnetic cards. In essence, the "magnetic stripe simulator" not only can simulate track 2 data but easily track 1 and track 3 data as well. Unlike the track 2 data which is only numeric, data format in tracks 1 and 3 are alphanumeric. The fact that the data density in both tracks 1 and 3 (210 bpi) is almost three times as dense as track 2 (75 bpi) poses hardly any problem for the brilliant "magnetic stripe simulator" prior art (U.S. Pat. No. 4,786,791 issued to Hodama in 1988) and the improvements subsequently advanced to it over the years (U.S. Pat. No. 5,434,398 to Goldberg in 1989, U.S. Pat. No. 5,955,961 to Wallerstein in 1999 and the present invention).

The embodiment of the present invention is not limited to the deployment of just one "magnetic stripe simulator" to emulate data encoded in track 2 of the MSB but can be extended to any number from one to three emulating all three tracks of a magnetic stripe. Since any data stored in the smart chip is secure, one's personal and vital medical records can certainly be safely stored there. These secure data can be outputted through track 3 of the MSB upon entering a special medical PIN number for the cardholder. This medical PIN number is accessible only to certain authorized health professionals such as the ambulance operators and the medical staff of emergency care centers equipped with a magnetic track 3 reader. This is but one example to show how the magnetic card world can be expanded for use in other information areas when linked to the world of the smart cards.

BRIEF DESCRIPTION OF THE DRAWINGS

These and other objects of the present invention, as well as many of the intended advantages thereof, will become more readily apparent when reference is made to the following description taken in conjunction with the accompanying drawings wherein:

FIGS. 1A, 1B and 1C depict front, back and side elevations, respectively, of a 'naked' smart card with only the smart chip embedded in it;

FIGS. 2A and 2B depict a 'Magnetic-Card-Reader-Admissible' smart card with no magnetic strip on back of card;

FIG. 6 is a partially exploded view of an advanced AMSB embodiment of the present invention to aid in readily visualizing its method of use;

FIG. 9 is a highly schematic 3-dimensional, exploded composite view of the advanced AMSB according to the present invention;

FIG. 10 is a highly schematic representation of the circuit layout of the AMSB partially overlaid with related/contiguous components.

BEST MODE FOR CARRYING OUT THE INVENTION

The present invention is a novel "bridge" device and methodology that together couple or link the world of the smart cards to that of the magnetic cards. Within this context, the magnetic cards world uses magnetic finance and security cards (credit, debit and access) with the cardholder's vital account information such as name, valid account number, expiration date, encrypted PIN etc. permanently encoded on one or more tracks of the magnetic stripe fabricated on the back of the card. A magnetic card reader is used to read out the information encoded on one or more tracks of the magnetic stripe for transaction processing. For credit cards, for example, the information needed to process credit transactions for goods or services resides on track 2. On the other hand, the smart cards world uses the so-called smart cards with a smart IC (integrated circuit) chip embedded in each of them. The most common type of smart cards is the "naked" kind. A "naked" smart card has only the smart IC chip embedded in it and nothing else. In the context of the present invention, the smart cards in the smart card world are of the "naked" kind. FIG. 1 depicts schematically a "naked" smart card. Its physical dimensions are exactly the same as those for the magnetic card, namely 3.375" long (l) by 2.125" wide (w) by 0.033" thick (t).

As its name implies, the novel "bridge" device of the present invention is called the "Magnetic Stripe Bridge" abbreviated as MSB. The main function of the MSB is to interface the smart card after authentication by same to a magnetic card reader for credit sale transaction using the existing magnetic card processing infrastructure. As such any smart card is effectively transformed via the use of the MSB into an ordinary magnetic credit card and admissible for use by any existing magnetic card reader for a short predetermined time. Hence the present invention allows a credit card issuing bank to issue smart cards in lieu of magnetic credit cards in order to take advantage of the smart card's superior secure attributes and capabilities. FIGS. 2A and 2B depict the front and back sides of a smart card issued by a bank to replace the magnetic credit card according to the teaching of the present invention. Like the old magnetic credit card, the name of the cardholder, the valid account number and the expiration date can all be embossed on the smart card with the usual issuing bank's holographic logo and the insignia of the credit card organization (VISA(R) or MASTERCARD(R), etc.) printed on the front of the card. Appearing on the same side as the various embossed characters and at a special designated location is the contact pads CP for the smart chip SC with the latter embedded underneath it. This smart card can also have a signature stripe (see FIG. 2B) on its back side along with additional alphanumeric code numbers printed on same for added security measures against fraud and identity theft by the issuing bank.

Figures 3A, 3B:
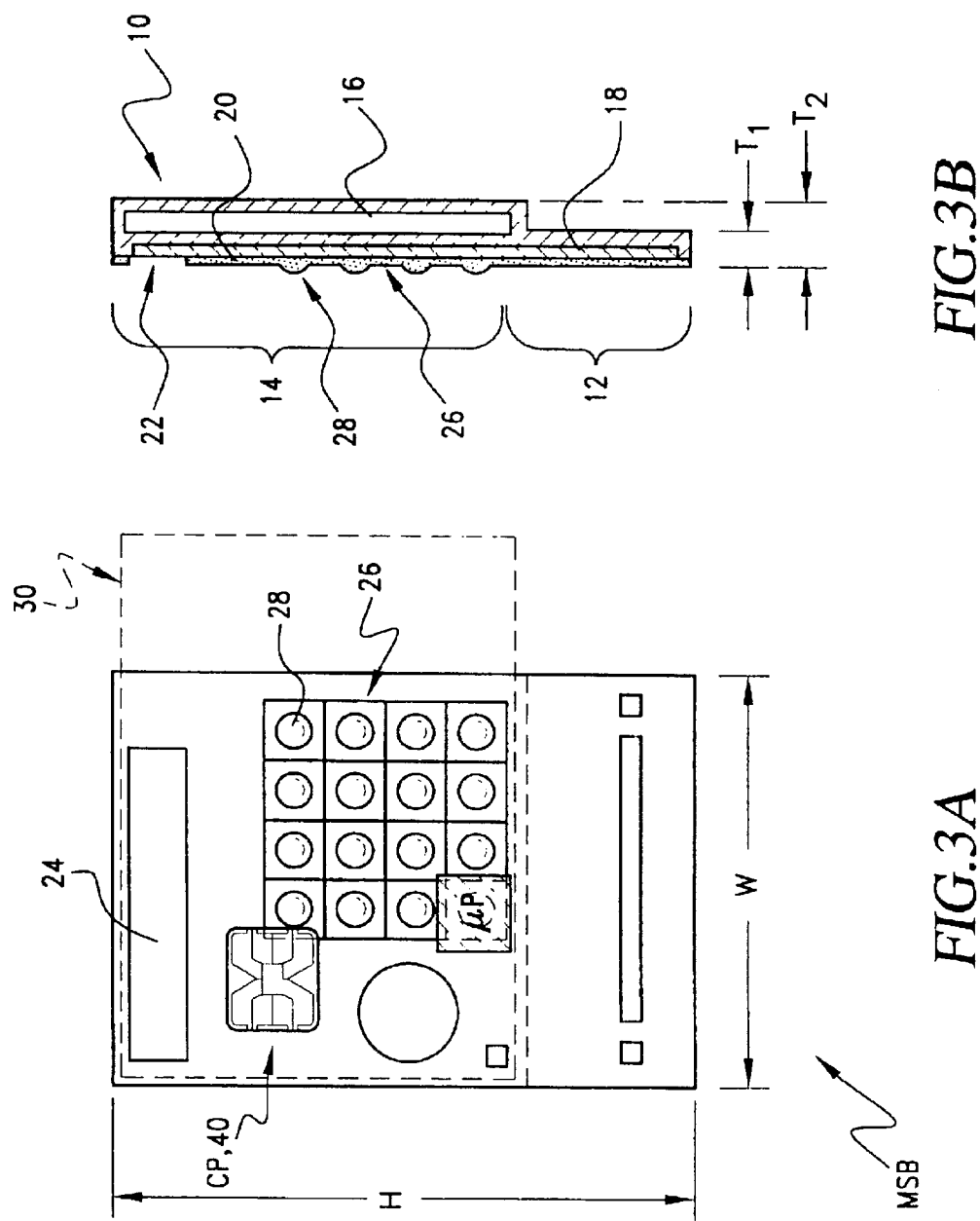
FIG. 3 shows schematically the physical layout for the Magnetic Stripe Bridge (MSB) according to the present invention.

FIGS. 3A and 3B show schematically the physical layout for the MSB. The MSB has a bottom casing 10 with a thin section 12 and a thicker section 14. A slot opening 16 is for the insertion of a smart card is fabricated on one side of the bottom casing 10, that is the right hand side when the thin section 12 of the casing 10 is oriented downwards as shown in FIG. 3. A two-sided printed circuit board (PCB) 18 is mounted securely in the bottom casing 10. A laminated polymer layer 20 with an opening 22 for showing a 10-digit alphanumeric LCD 24 and the layout of the 16-key keypad 26 with individual conductive buttons, of which 28 is typical, is placed on top of bottom casing 10 to complete the packaging for the MSB. An illustrative MSB may have the overall dimensions of 3.5" in height H, 2.5" in width W, as well as the thicknesses 0.033" for its thin section T1 and 0.125" for its thicker section T2.

Figure 4:
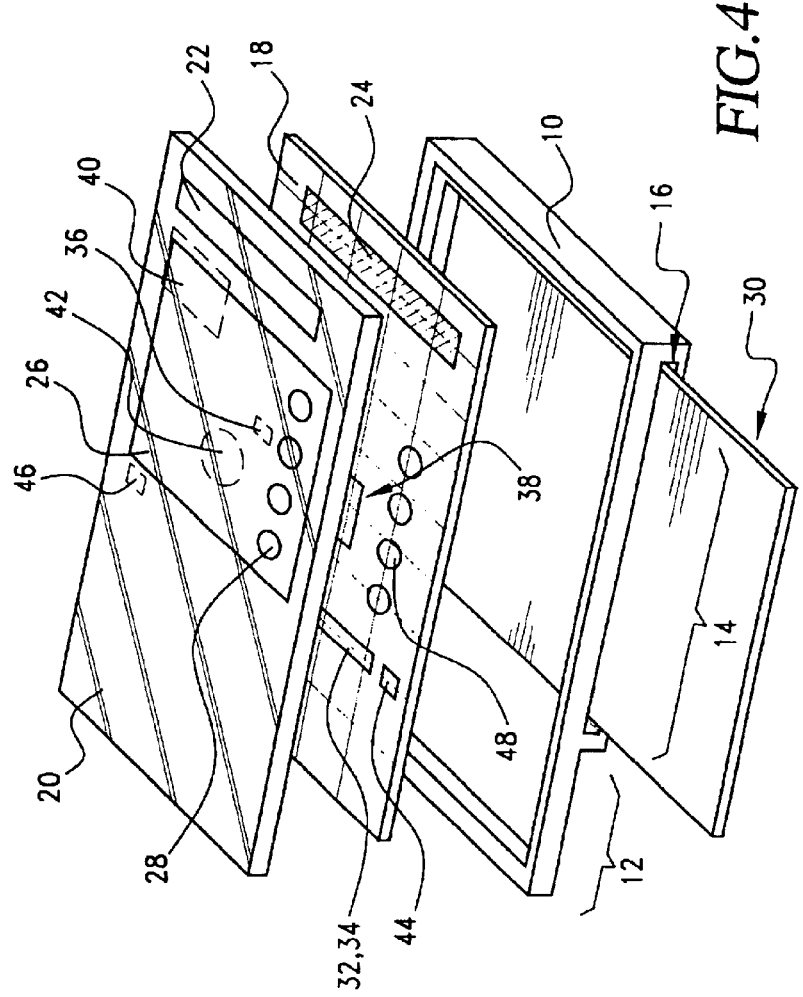
FIG. 4 depicts a highly schematic 3-dimensional exploded composite view of the (MSB) according to the present invention.

FIG. 4 depicts a 3-dimensional composite view of the MSB. The bottom casing 10 constitutes the bottom layer with the thin section 12 elevated from the thicker section 14. A smart card 30 is shown fully inserted into the right hand side slot opening 16 with a portion of the smart card remaining on the outside. The two-sided PCB 18 constitutes the next layer. On the bottom side of PCB 18 are mounted respectively a magnetic stripe simulator 32 in a carved out trough 34 in the thin section 12 of the bottom casing 10. A contact switch 36 is also mounted on the bottom side of PCB 18 to wake up the microprocessor MMSB 38 when the smart card 30 is fully inserted into the slot 16 of the bottom casing 10. Finally a smart card flexible contact pad 40, a microprocessor MMSB 38 (such as Microchip PIC 16C924 or T1 MSP430F135), a 10-digit alphanumeric LCD 24 and a flat lithium battery 48 are also mounted on the bottom side of PCB 18.

The circuit pattern layout for the 16-key keypad 26 is delineated on the top side of PCB 18. Two contact switches 44 and 46 in line with the magnetic stripe simulator 32 are also fabricated on the top side of the PCB 18. Either one of these two contact switches 44 or 46 is used to provide in one embodiment of the present invention the correct timing for the MMSB 38 to transmit the track 2 data in storage to the magnetic card reader via the magnetic stripe simulator 32.

Finally the laminated polymer layer 20 with an opening 22 for allowing the protrusion of the LCD 24 to be flush with the top surface of this layer completes the composite structure of the MSB. The 16-key keypad buttons, of which 28 is typical, are delineated on the top side of this laminated layer 20 with the individual conducting pads, of which 48 is typical, for each of the keypad keys fabricated on the bottom side in correct registration with the circuit layout for the keypad 26 on the top surface of the PCB 18.

Figure 5:
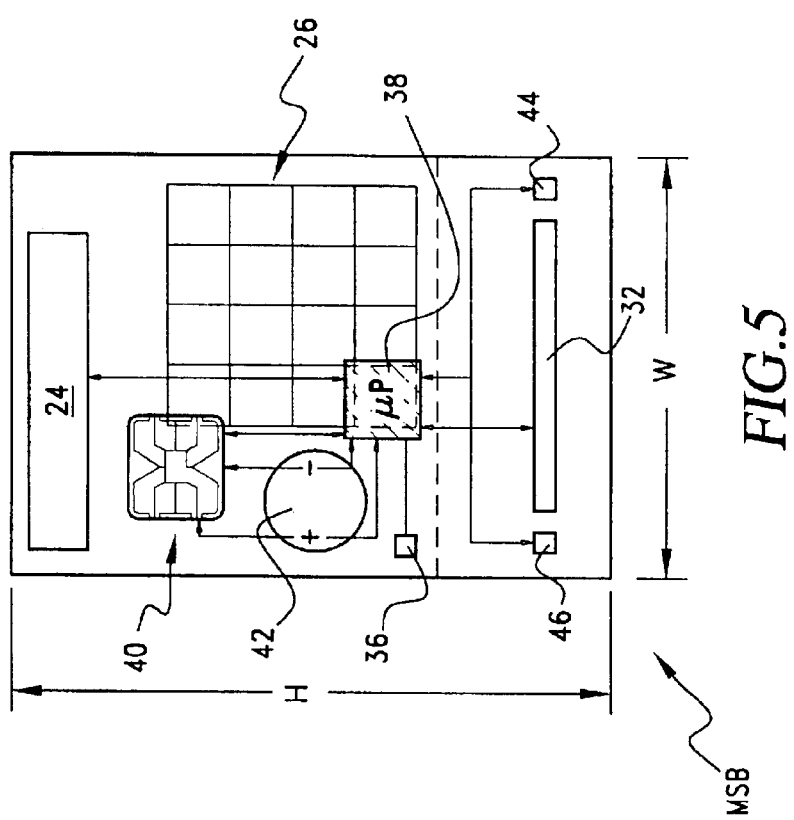
FIG. 5 shows schematically the circuit layout for the (MSB)

FIG. 5 shows in highly schematically form the circuit layout for the MSB. The microprocessor MMSB 38 is the nerve center for the MSB. Its first important function is to establish communication with the smart chip residing on the smart card. In operation, when the smart card 30 is inserted fully into the side slot 16 of the MSB (see the dashed lines of FIG. 3), the contact switch 36 is closed thereby waking up the entire circuit of the MSB. Power is now available through the thin lithium battery 42 in concert with the flexible contact pad 40 to the smart chip of the smart card (see FIGS. 1 and 2). Then the MMSB 38 will initiate an Answer-To-Reset (ATR) protocol to the smart chip according to ISO 7816 standard through the RST pin of the latter. After the smart card 30 responds to this signal indicating that the communication between the MMSB 38 and the smart chip of the smart card is operational, the MMSB will effect a message "ENTER PIN" to the 10-digit alphanumeric LCD display 24 to appear.

The cardholder (or user), upon seeing this instruction appearing on the LCD display 24, can now enter his or her 4- or 6-digit PIN number using the keypad 26. Upon receiving this PIN number, the MMSB 38 will relay this PIN number to the smart card with the instruction to verify the validity of this data. In the event that this PIN number is valid, the smart card will relay this information back to the MMSB 38 and at the same time send over the track 2 data which is stored in the EEPROM of the smart chip to the MMSB 38 using its I/O pin. MMSB 38 acknowledges the receipt of this data and effects a message "OK 4 READER" to appear on the LCD 24. At this point the smart card 30 has played out its role in the transaction and it can be pulled out of the side slot 16 of the MSB for safekeeping.

In the event that the PIN number is invalid, the smart card will relay this message to the MMSB 38. MMSB 38 will acknowledge and effect a message "TRY AGAIN" to appear on the LCD 24. The cardholder can enter his or her PIN number again using the keypad 26. When the smart card receives a predetermined number of consecutive invalid PIN numbers (three, for example), it will relay this message to the MMSB 38 and at the same inform the latter that it will no longer verify any more PIN numbers. MMSB then effects a message "INVALID PIN" to appear on the LCD 24 and at the same time shuts itself off and blanks the LCD 24. However, to reactivate the MSB after its shutdown, one simply has to pull out the smart card from the side slot 16 (if it is still engaged with the MSB) and re-insert it to resume operation. If the smart card has already been pulled out of the MSB, one simply re-inserts the smart card to achieve the same result.

When the message "OK 4 READER" appears on the LCD 24 indicative the fact that the MMSB 38 has correctly received and stored all the track 2 transaction data information from the smart card, the MSB has effectively taken over the role as the "magnetic-card-reader-admissible smart card". The merchant or sales clerk can now treat the MSB as if it is a valid magnetic credit card transformed from the smart card. There is, however, a finite life to this condition. Time-out logic circuitry within the MMSB 38 establishes a predetermined duration after which the most recently stored data is purged and the MSB is returned to its inactive, quiescent state. Intervals on the order of 3–10 minutes are contemplated for this sunset or time-out feature. In one preferred embodiment of the MSB, the merchant can simply swipe the thin section 12 (of FIG. 3) of the MSB through the magnetic card reader. Depending upon which direction the merchant is swiping the MSB through the magnetic card reader slot, either contact switch 44 or 46 will close. This closure is processed to generate the correct timing information to the MMSB 38 to ensure that the track 2 data will be reliably transmitted over to the reader head through the use of the magnetic stripe simulator 32. The transaction will then be put through to the existing magnetic card processing infrastructure like any conventional magnetic credit card.

In an alternate preferred embodiment of the MSB, the merchant can simply place the thin section 12 (of FIG. 3) of the MSB into the slot of the magnetic card reader from the top and approximately center it in the middle of the reader where the reader head is located. He then pushes one of the designated key buttons on the keypad 26 of the MSB to initiate the process of sending the data over to the magnetic card reader via the magnetic stripe simulator 22.

In either of the two preferred embodiments of the MSB described above, the merchant can "swipe" or "center and push button" the MSB several times just like he is handling an ordinary magnetic credit card.

Finally, as discussed earlier above, the present invention of the MSB and the methodology is not limited just to transform a smart card into a magnetic-card-reader-admissible card and thereby taking full advantage of the security attributes of the smart card to significantly reduce financial card frauds and identity thefts without having to change the current magnetic card processing equipment and infrastructure. It is evident from FIGS. 3 and 5, the so-called thin section 12 of the MSB can accommodate not just one, but three or more magnetic stripe simulators since the typical width of the latter is only 0.120" and the thin section is about 1.000". Since any data stored in the smart chip is secure, one's personal and vital medical records can certainly be safely stored there. These secure data can be outputted for example through track 3, much like the case for track 2 of the MSB upon the entering of a special medical PIN number (as contrast to a financial PIN number) by the cardholder or other authorized personnel. This medical PIN number can be arranged to be only accessible to certain authorized health professionals such as operators of ambulances and the medical staff of emergency care centers where relatively inexpensive (<$100) magnetic track 3 readers are made available and maintained. This is but one example to show how the magnetic card world can be expanded for use in other information areas when linked to the world of the smart cards through the use of the present invention.

Whereas the above described baseline and alternate preferred embodiments of FIGS. 1–5 and 11 are directed to interfacing smart cards with existing, conventional lateral-type magnetic card readers, the techniques taught therein may be extended to enable an even more advanced embodiment to be also used with ATM-type card reading terminals. This is accomplished in an improved preferred embodiment detailed in connection with FIGS. 6 through 11.

Referring first to FIG. 6, there is shown a preferred advanced embodiment of a magnetic stripe bridge adapted for use with both lateral swipe-type readers as well as with ATM-type terminals which require a substantially full longitudinal insertion of the proffered card. An advanced magnetic stripe bridge AMSB is shown in partially exploded overall system form to pictorially indicate its method of use. The AMSB is shown in its fully extended state ready to receive a smart card such as one of the kind previously described in connection with FIG. 2A. As with the previously described versions, the AMSB has a casing 110, a smart card receiving slot 116, an alphanumeric display 124 and a keypad 126. An extension member 150 is shown as including a credit card sized portion 150A and a shorter connecting portion 150B. By way of a brief operating overview, a user first: ←(A)-- pulls out the extension member 150 to its maximum extent; then --(B)→ inserts his or her smart card 130 into the slot 116; and then ←(C)-- inserts the a user-related validating PIN number using the keypad 126 responsive to receiving a visual prompting message on the LCD display 124. Thereupon, presuming a successful system validation/authorization step, ←-(D)-- the credit card sized portion of the extension member 150 is inserted longitudinally into the ATM-type terminal slot to thereby complete the desired transaction as usual. Just prior to step (D), the smart card 130 may optionally remain in the slot 116, or preferably is removed by the card holder for safe-keeping. For use with lateral, swipe-type readers, a slightly different but still few-step method is used. Following completion of the same steps (A) through (C) as shown in FIG. 6, and after receipt of the validation/authorization prompt, the user merely --(E)→ retracts the extension member 150 back to its fully retracted position (as shown and described in FIG. 7A) and then --(F)-- laterally swipes the exposed, lower portion of the extension member 150 through a conventional magnetic card reader to thereby complete the desired card-authorized transaction as usual.

Note that the direction of the arrow ←-(D)-- denotes the longitudinal axis for both the AMSB and the overall system axes for all embodiments described herein, and further that the direction of the arrow --(B)-- denotes the orthogonal lateral AMSB/MSB/system axes. The card readers described (ATM, swipe, etc.) do not form part of the present invention, nor do any of the various types cards with which the invention operates.

Figure 7B:
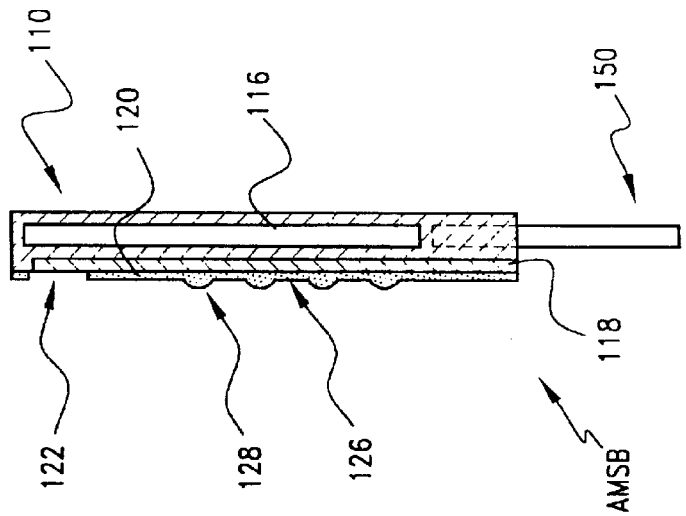
FIGS. 7A and 7B show schematic frontal (top) and side views, respectively, of the advanced AMSB embodiment depicting its movable part in a first or normal position for storage, or for usage with a swipe-type reader.
Figure 7A:
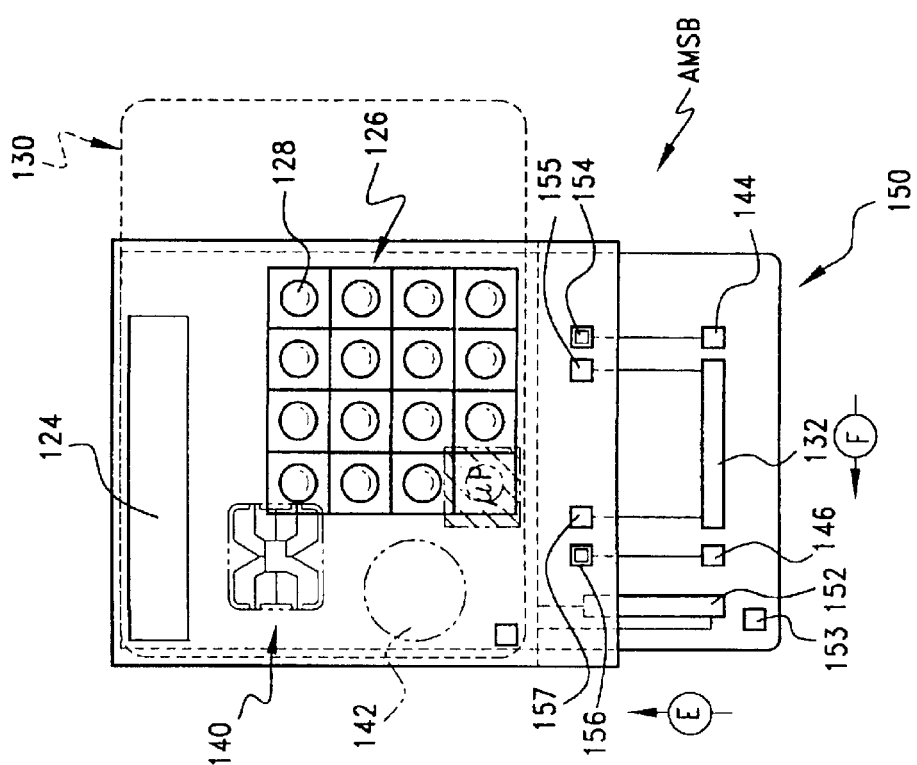

Referring now to FIG. 7A, there is shown a schematic top (or frontal) view of the advanced AMSB with its extension member 150 occupying a first normal (or storage) position suitable for use with a swipe-type card reader. The side view of FIG. 7B illustrates the location, orientation and extent of the of the portion of extension member 150 which is external to the casing 110. In FIG. 7A, a magnetic stripe simulator 132 and contact switches 144, 146 (and 153 for the advanced preferred embodiment), now reside on the extension member portion 150A. Also on the extension member portion 150A is another completely independent magnetic stripe simulator 152. As explained below, magnetic stripe simulator 132, now designated as the lateral magnetic stripe simulator, is used for the swiping motion type card readers, whereas the magnetic stripe simulator 152, now designated as the longitudinal magnetic stripe simulator, in conjunction with the contact switch 153 is used for the insertion type card readers. The AMSB is shown in its so-called normal position or state wherein it is operable for swipe-type usage as previously described. When retracted as shown by the arrow --(E)→, detent means (not shown) may be used to retain the extension member 150 in the desired positions. Also, the circuit elements of FIG. 7A which are embedded within the extension member portion 150A are not shown in phantom, merely for clarity of exposition, and that a minute speaker 123 is positioned on the face of the casing 110 to provide audible signals which may add to or substitute for the prompting messages provided on the LCD display 124. Small indicator lamps, of which lamp 125 is typical, may further be carried on the casing 110 face to provide additional visual status clues or prompts for a bridge user.

Note that the numerical designations of the advanced embodiments of FIGS. 6 through 10 are assigned in the 100 series, with the last two digits corresponding to those elements previously described in connection with the embodiments of FIGS. 1 through 5. Unless otherwise noted, the 100 series elements function virtually identically to their lower numbered cousins thereby not requiring further description.

Figures 8A, 8B:
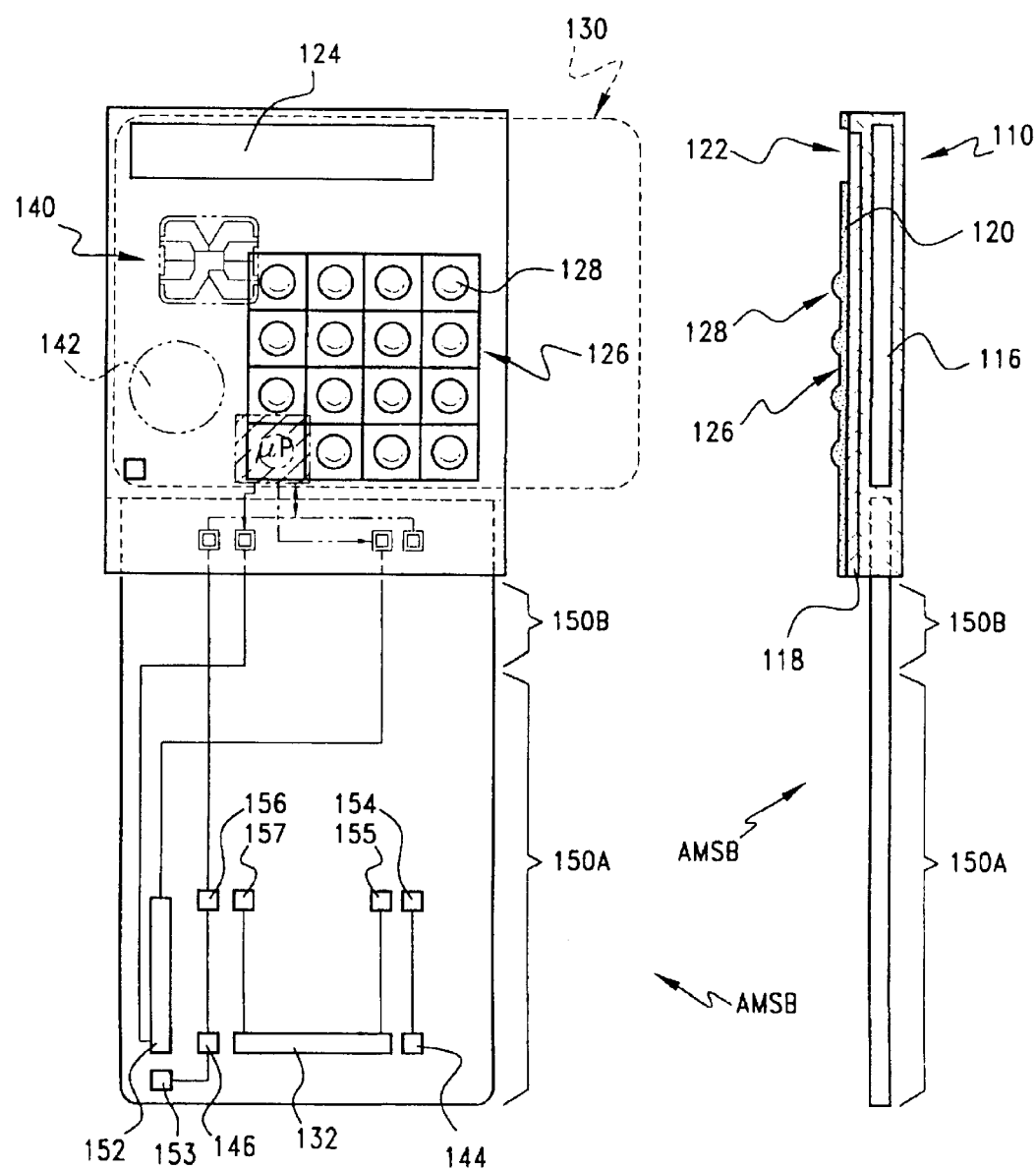
FIGS. 8A and 8B show schematic frontal and side views, respectively, of the advanced AMSB embodiment depicting its movable part extended to a second or fully extended position for usage with an insertion-type reader.

Referring now to FIG. 8A (FIG. 8B is a side view thereof), when it is desired that the AMSB device be used for service, the extension member 150 is pulled out to its maximum extent, and held there by detent means (not shown). By doing so, the extension member 150 vacates the space within casing 110 such that the smart card 130 can be inserted for verification. After the card holder enters the PIN number via the keypad 126 and receives authentication to proceed on the LCD display 124, and possible audio prompts from the speaker 123 as well, he or she has a choice to make depending upon whether the swiping motion type magnetic card reader or the insertion type magnetic card reader is being used. For use with a swiping motion type reader, the cardholder has to remove the smart card and push the extension member 150 back to its original or normal position as was shown in FIG. 7A. In doing so, AMSB circuitry determines that the magnetic stripe simulator 132 is to be used. Additionally, contact switches 144 and 146 can also be used to implement the conventional swiping motion of the AMSB, as previously described.

For use with an insertion type reader, the cardholder can simply insert the fully extended portion 150A into the insertion slot of a card reader until it cannot go any further. In this case, the magnetic stripe simulator 152 will be used in conjunction with contact switch 153. Contact switch 153 in this case is tied electrically to contact switch 146 whereas contact switch 144 is no longer in use in this mode of operation. The function of contact switch is to alert the microprocessor in the AMSB that the magnetic stripe simulator is now in its proper position for the processor to transmit track 2 magnetic stripe data to the card reader via the magnetic stripe simulator 152. Much like the case for electrically contacting the smart card with the flexible contact pad 140 (as described in connection with element 40 of FIG. 4) which resides on the opposite side of the PCB 118, contacts which mate with the contact switches 144 and 146, namely 154 and 156, as well as contacts 155 and 157 to the magnetic stripe simulators 132 and 152, namely 165 and 167 also reside on the same side of the PCB 118.

Referring now to FIG. 9 there is shown a highly schematic, 3-dimensional, partially exploded view of the advanced AMSB to illustrate the orientation and spatial relationships of the various circuit layers and related components. The perspective is such that only the slot 116 for insertion of the smart card is shown but not the card itself. Note the overall layout similarity with the earlier embodiment described in connection with FIG. 4, and especially the functioning of the correspondingly numbered elements. Also, the magnetic stripe simulators 132 and 152 and the contact switches 144, 146 and 153 can also be seen as residing on the extension portion 150A. The location of mating contacts 164–167 on PCB 118 are also shown.

Referring now to FIG. 10, an additional highly schematic planar representation of the circuit layout of the advanced AMSB is shown. To aid in interpretation the spatial relationships and the orientation of the various components, components on several layers/sides have been partially overlaid. Note the overall layout similarity with the embodiments described in connection with FIG. 5, as well as the similar functioning of the correspondingly numbered elements as previously described. Conspicuously missing from PCB 118 is the magnetic stripe simulator. Taking its place are two contact pads 165 and 167 which communicate with the microprocessor 138. Further shown are contact pads 164 and 166 which also directly communicate with the microprocessor 138. Note that contact pads 164–167 serve similar functions as the flexible contact pads previously mentioned, that is, they make contacts with the magnetic stripe simulators 132 and 152, and also with contact switches 144, 146 and 153 which reside on the extension member portion 150A.

Figure 11:
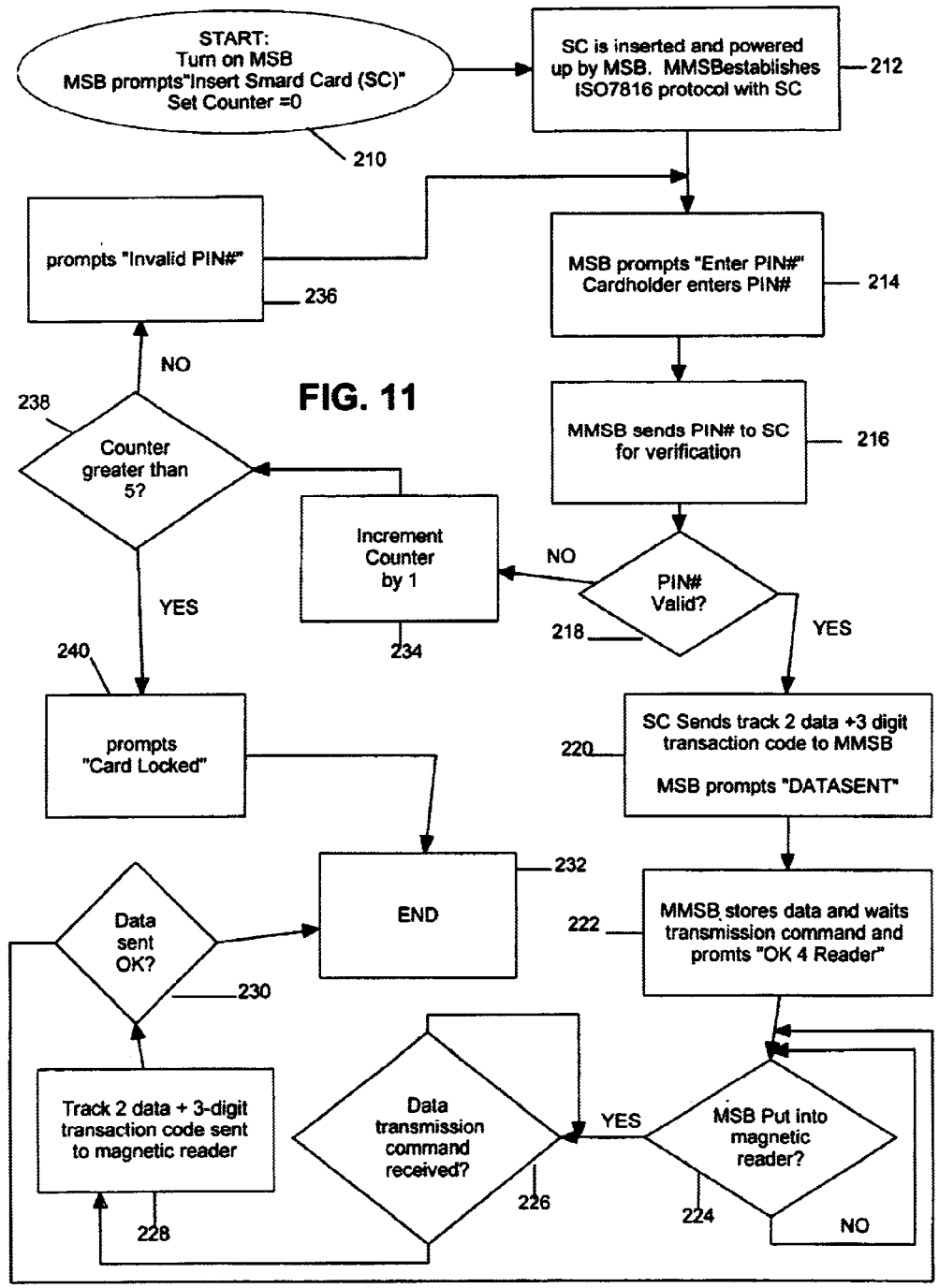
FIG. 11 is a flow chart detailing the method sequences implemented in all embodiments of the present invention.

Referring now to the system flow chart of FIG. 11, there are detailed the multiple steps used to implement the various steps and processes needed to support the all embodiments of the present invention. The steps include activating the MSB (or AMSB) in 'start' block 210, followed by insertion of a smart card in block 212, corresponding to the step --(B)→ of FIG. 6. Thereafter, the process steps as set forth in the specification above are carried out to reach a successful initiation and completion of a desired card-authorized financial or data transfer transaction in the 'end' step of block 232. Note the 'five try' PIN number limitation as carried out in the closed loop process in blocks 218, 234, 236, 238 and 240.

Although the invention has been described in terms of preferred and selected alternate embodiments plus advanced preferred embodiments, the invention should not be deemed limited thereto since other embodiments and modifications will readily occur to one skilled on the art. It is therefore to be understood that the appended claims are intended to cover all such modifications as fall within the true spirit and scope of the invention.

What is claimed is:

1. A method for carrying out a card-authorized financial or data transfer transaction by interfacing a smart card with magnetic card readers comprising the steps of:

(a) providing a magnetic stripe bridge having a slot for receiving a smart card, processing circuitry for electronically performing a plurality of method-supporting steps, user-actuated input means, a user-actuable extension member movable to first and second exposed positions, and at least one magnetic stripe simulator;

(b) inserting said smart card into said bridge slot while said extension member is in a second exposed position for allowing an authorization evaluation step by said processing circuitry;

(c) entering a user-known PIN via said input means to allow the conduct of said authorization evaluating step by said processing circuit, and upon successful completion thereof; and (d) longitudinally inserting said extension member in said second exposed position into a card slot of said magnetic card reader for transmission of magnetic stripe simulation signals provided by said processing circuitry thereby enabling a card-authorized transaction.

2. The method of claim 1 wherein said provided bridge further comprises processing circuit driven means for indicating the operating status of said method and for providing method-facilitating prompts, whereby a user may timely insert said card and/or timely enter said PIN and/or timely insert said extension member.

3. The method of claim 2 wherein said means for indicating include one or more indicators selected from the group containing a multi digit alphanumeric display and a speaker and color coded indicator lamps, whereby a user may more readily be facilitated in timely inserting said card and/or timely entering said PIN and/or timely inserting said extension number.

4. The method of claim 1 wherein said input means includes a multiple key keypad such that a bridge user may more readily enter said PIN.

5. The method of claim 1 wherein said at least one magnetic stripe simulator is configured to include two orthogonally oriented magnetic stripe simulators whereby with said extension member in its second position said card may be inserted into said slot for authorization evaluation and following successful evaluation said extension member may be moved to its first exposed position and presented laterally to a card-swiping slot of said magnetic card reader for transmission of said simulated magnetic stripe signals via a suitable oriented magnetic stripe simulator, thereby enabling a card-authorized transaction.

6. A system for interfacing a smart card with magnetic card readers, comprising:

(a) a magnetic stripe bridge having a slot for receiving a smart card and further having a processing circuitry for electronically interfacing with said card and for carrying out other system functions;

(b) said bridge further having user-actuated input means operatively connected to said processing circuitry for entering a user-related PIN for authorization evaluation by said processing circuitry;

(c) said bridge further having a user-actuable extension member operatively connected to said processing circuitry, said member movable to first and second exposed positions, said member including at least one magnetic stripe simulator for producing signals operable responsive to said processing circuitry; and (d) whereby with said extension member in its second exposed position said card may be inserted into said slot for authorization evaluation and following successful evaluation said extension member may be presented longitudinally into a card slot of said magnetic card reader for transmission of said magnetic stripe simulated signals thereby enabling a desired card-authorized transaction.

7. The system of claim 6 wherein said bridge further comprises indicator means operatively connected to said processing circuitry for indicating the operational status of said bridge and for prompting a user, thereby facilitating the successful initiation and completion of a desired card authorized financial or data transfer transaction.

8. The system of claim 7 wherein said indicator means includes a LCD alphanumeric display.

9. The system of claim 6 wherein said input means includes a multiple pad keypad.

10. The system of claim 6 wherein said at least one magnetic stripe simulator is adapted to include two orthogonally oriented magnetic stripe simulators whereby with said extension member in its second exposed position said card may be inserted into said slot for authorization evaluation and following successful evaluation said extension member may be moved to its first exposed position and presented laterally to a swipe-type card reader for transmission of simulated magnetic stripe signals via a suitable oriented magnetic stripe simulator, thereby enabling a desired card-authorized transaction.

* * * * *